(12) United States Patent
Williams

(10) Patent No.: US 7,594,286 B2
(45) Date of Patent: Sep. 29, 2009

(54) ANGLE INDICATOR

(75) Inventor: Samuel Z. Williams, Brookline, MA (US)

(73) Assignees: Brigham & Women's Hospital, Boston, MA (US); The General Hospital Corporation, Boston, MA (US)

( * ) Notice: Subject to any disclaimer, the term of this patent is extended or adjusted under 35 U.S.C. 154(b) by 324 days.

(21) Appl. No.: 11/509,465

(22) Filed: Aug. 24, 2006

(65) Prior Publication Data

US 2007/0044237 A1 Mar. 1, 2007

Related U.S. Application Data

(60) Provisional application No. 60/711,312, filed on Aug. 25, 2005.

(51) Int. Cl.
*A61G 7/00* (2006.01)
*G01C 9/32* (2006.01)

(52) U.S. Cl. .............................. 5/424; 33/354; 33/348; 33/391

(58) Field of Classification Search ............... 5/610, 5/424; 33/333, 354, 366.11, 366.15, 366, 33/24, 391, 396, 397, 399, 348
See application file for complete search history.

(56) References Cited

U.S. PATENT DOCUMENTS

| | | | |
|---|---|---|---|
| 2,403,420 A | | 7/1946 | Willingham |
| 3,220,019 A | * | 11/1965 | Nelson ........................... 5/610 |
| 3,800,426 A | * | 4/1974 | Nakamura .................... 33/368 |
| 3,806,109 A | * | 4/1974 | Weber et al. .................... 5/610 |
| 3,864,861 A | | 2/1975 | Hill, Jr. |
| 4,205,665 A | * | 6/1980 | Burton ......................... 602/35 |
| 4,578,980 A | | 4/1986 | Beckman |
| 4,914,823 A | * | 4/1990 | Harris ........................ 33/378 |
| 5,082,357 A | | 1/1992 | Haas et al. |
| 5,187,873 A | | 2/1993 | Jeng et al. |

(Continued)

OTHER PUBLICATIONS

Torres A., et al., Pulmonary Aspiration of Gastric Contents in Patients Receiving Mechanical Ventilation: The Effect of Body Position; Universitat de Barcelona, Spain, Ann Intern Med. Apr. 1, 1992;116(7):540-3.

(Continued)

*Primary Examiner*—Michael Trettel
(74) *Attorney, Agent, or Firm*—Edwards Angell Palmer & Dodge LLP; Peter C. Lauro, Esq.; Brian R. Pollack, Esq.

(57) ABSTRACT

An angle indicator is provided for measuring an angle of inclination of a structure with respect to a plane, such as a horizontal or vertical plane. The angle indicator includes a housing adapted and configured to be mounted to the structure, an indicator movably disposed in the housing having an angular range of motion about an axis intersecting the plane, and indicia provided on the housing for indicating proper angulation of the structure with respect to the plane. The indicia can be defined at least in part by a first arcuate segment, wherein the indicia and the indicator are configured to be in visual alignment to an observer when the angle of inclination of the structure with respect to the plane achieves a predetermined angle. In accordance with a preferred embodiment of the invention, the predetermined angle can be about thirty degrees.

37 Claims, 7 Drawing Sheets

U.S. PATENT DOCUMENTS

| | | | | |
|---|---|---|---|---|
| 5,205,004 | A | * | 4/1993 | Hayes et al. .................. 5/611 |
| 5,542,138 | A | | 8/1996 | Williams et al. |
| 5,740,881 | A | | 4/1998 | Lensak |
| 5,956,855 | A | * | 9/1999 | Foss et al. .................. 33/391 |
| 6,168,853 | B1 | | 1/2001 | Feng et al. |
| 6,182,310 | B1 | * | 2/2001 | Weismiller et al. ............ 5/425 |
| 6,336,235 | B1 | | 1/2002 | Ruehl |
| 6,397,716 | B1 | | 6/2002 | Garuglieri |
| 6,505,365 | B1 | | 1/2003 | Hanson et al. |
| 6,874,240 | B1 | * | 4/2005 | Cruttenden .................. 33/451 |
| 2004/0194329 | A1 | | 10/2004 | Drahos et al. |
| 2004/0207241 | A1 | | 10/2004 | Sedlack |
| 2005/0125899 | A1 | | 6/2005 | Hanson et al. |

OTHER PUBLICATIONS

Fernandez-Crehuet R., et al., Nosocomial Infection in an Intensive-Care Unit: Identification of Risk Factors; Department of Preventive Medicine, Reina Sofia University Hospital, Cordoba, Spain; Infect Control Hosp Epidemiol. Dec. 1997;18(12):825-30.

Orozco-Levi M., et al., Semirecumbent Position Protects From Pulmonary Apiration but not Completely From Astroesophageal Reflux in Mechanically Ventilated Patients; Department de Medicina, Universitat de Barcelona, Spain; Am J Respir Crit Care Med. Oct. 1995;152(4 Pt 1):1387-90.

Kollef, M.H., Ventilator-Associated Pneumonia. A Multivariate Analysis, Department of Internal Medicine, Washington University School of Medicine, St. Louis, MO 63110; JAMA, Oct. 1993; 270: 1965-1970.

Helman, Donald L., et al., Effect of Standardized Orders and Provider Education on Head-of-Bed Positioning in Mechanically Ventilated Patients; Crit Care Med 2003, vol. 31, No. 9, pp. 2285-2290.

Drakulovic, Mitra B., et al., Supine Body Position as a Risk Factor for Nosocomial Pneumonia in Mechanically Ventilated Patients: A Randomised Trial, The Lancet; Nov. 27, 1999; 354, 9193, Research Library, pp. 1851-1858.

Webster, Nigel R., Importance of Position in Which Patients are Nursed in Intensive-Care Units; The Lancet; Nov. 27, 1999; 354; 9193; Research Library, p. 1835.

Hill-Rom, User Manual—Advanta™ Bed—From Hill-Rom, Product No. P1600, www.hill-rom.com; usr017rb/Sep. 2002, Hill-Rom Services, Inc.

Grap, Mary Jo, et al., Predictors of Backrest Elevation in Critical Care, Intensive and Critical Care Nursing (2003) 19, pp. 68-74.

100,000 Lives Campaign; How-to Guide: Prevent Ventilator-Associated Pneumonia; pp. 1-34; http://www.ihi.org/IHI/Programs/Campaign/.

CDC, Morbidity and Mortality Weekly Report, Guidelines for Preventing Health-Care-Associated Pneumonia, 2003—Recommendations of CDC and the Healthcre Infection Control Practices Advisory Committee, Mar. 26, 2004 / vol. 53 / No. RR-3.

International Preliminary Report on Patentability dated Feb. 26, 2008.

* cited by examiner

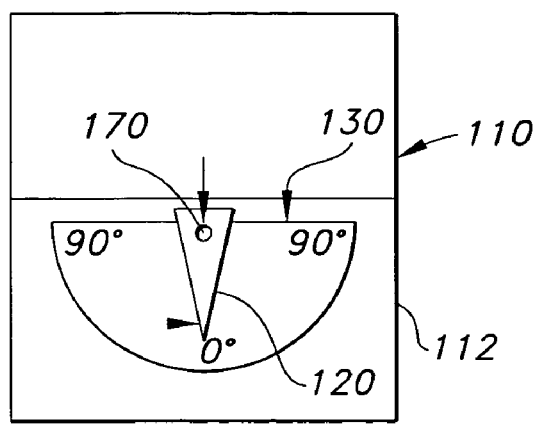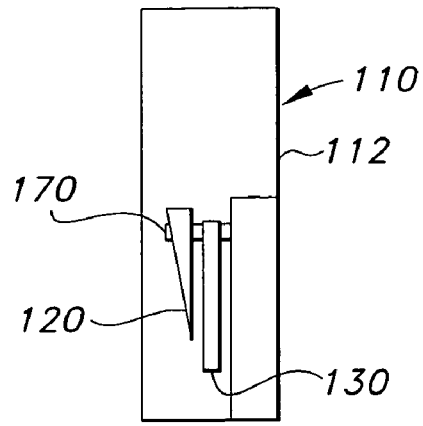
FIG. 7A  FIG. 7B
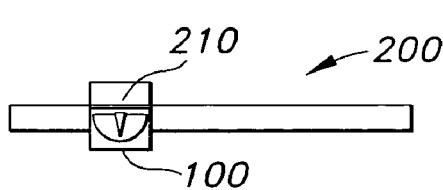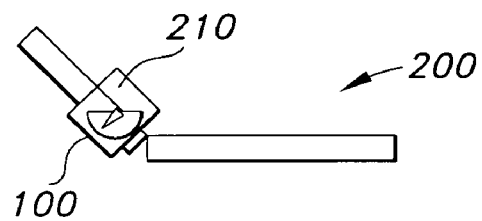
FIG. 7C  FIG. 7E
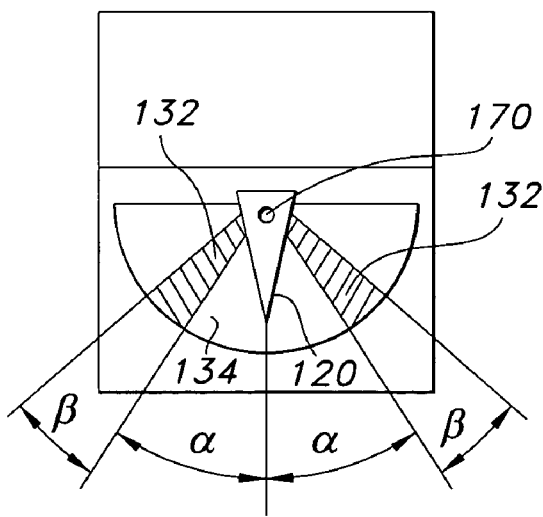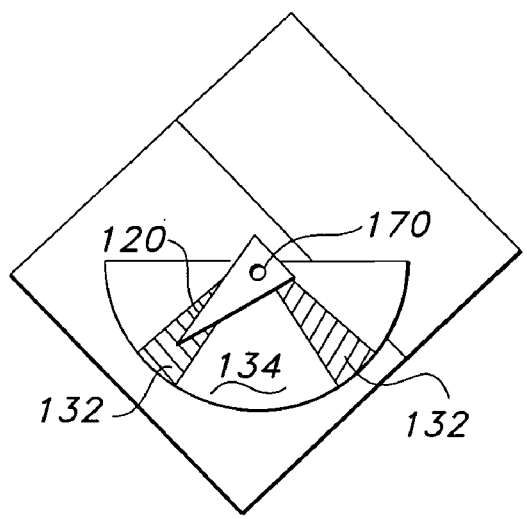
FIG. 7D  FIG. 7F

ANGLE INDICATOR

CROSS-REFERENCE TO RELATED APPLICATION

This application claims the benefit of priority from U.S. Provisional Patent Application Ser. No. 60/711,312, filed Aug. 25, 2005, the disclosure of which is incorporated by reference herein in its entirety.

BACKGROUND OF THE INVENTION

1. Field of the Invention

The present invention relates to an angle indicator. Particularly, the present invention is directed to an angle indicator for indicating an angle of a structure with respect to the horizontal plane.

2. Description of Related Art

A variety of devices are known in the art for measuring the angle of a structure with respect to a reference point or location, such as another structure. Of such devices, certain devices are directed to measuring the elevation of the head of a hospital patient bed.

Accurate measurement of the elevation of the head of a patient bed can be vital to decrease rates of aspiration pneumonia in patients. In 1992, Torres et al. showed that placing a patient in a semirecumbent position (i.e., at a 45-degree angle) decreases aspiration of gastric contents to the airways in intubated and mechanically ventilated patients ("Pulmonary aspiration of gastric contents in patients receiving mechanical ventilation: the effect of body position," Ann. Intern. Med. 116(7):540-3 (1992)). In 1993, Kollef showed that supine head positioning during the first 24 hours of mechanical ventilation was independently associated with mortality ("Ventilator-associated pneumonia. A multivariate analysis," JAMA, 270: 1965-1970 (1993)). Later, Fermandez-Crehuet et al. showed that the main risk factors for developing nosocomial infections among intubated patients were intrinsic ("Nosocomial infection in an intensive-care unit: identification of risk factors," Infect. Control Hosp. Epidemiol. 18(12):825-30 (1997)). Significant extrinsic risk factors identified included maintaining the head of the patient's bed in a horizontal position, particularly less than thirty degrees with respect to the horizontal. In fact, this variable presented the highest increase of the infection hazard ratio.

In 1997, the Centers for Disease Control and Prevention issued Guidelines for Preventing Heath-Care-Associated Pneumonia that recommended that patients receiving mechanical ventilation have the head of the bed elevated 30-45 degrees above the horizontal to prevent nosocomial pneumonia.

Thus, a compelling need has been recognized to elevate the head of a patient's bed in order to preserve the health of patients. In fact, the Institute for Healthcare Improvement (IHI) has instituted a "100,000 lives" campaign to prevent avoidable hospital deaths. One of the six areas they identified were deaths due to Ventilator-Associated Pneumonia (VAP) with the objective of preventing 100,000 deaths between January, 2005 and January, 2006 by educating hospital staff regarding the importance of maintaining adequate head of bed elevation and improving rates of adequate head-of-bed elevation. According to the IHI, VAP is the leading cause of death among hospital-acquired infections, wherein hospital mortality of ventilated patients who develop VAP is 46%, compared to 32% for ventilated patients who do not develop VAP. The IHI estimates that VAP adds an estimated cost of $40,000 to a typical hospital admission.

A number of devices have been proposed to maintain adequate head of bed elevation. A first example includes a track underneath the bed running the length of the bed. Angles from ten to sixty degrees above the horizontal in five-degree increments are indicated. A bar extends from the head of the bed to the track. As the head of the bed is elevated, the bar moves along the track and the elevation of the head can be determined by reading the angle indicated along this bar.

However, there are significant drawbacks relating to this device. First, the health care provider (e.g., nurse, physician, etc) must bend down and look under the bed to read the angle. Second, hospital beds are sometimes placed on a tilt in the Trendelenberg position. Since the bed angle only measures the elevation of the head relative to the bed, when the entire bed is not level, the bed angle indicator does not work. Practically, since beds are often in the Trendelenberg position, nurses don't bother to look at the angle indicators since they don't accurately reflect the head-of-bed elevation. Finally, this device indicates angles from ten to sixty degrees. This only serves to confuse and distract nurses who are already having to deal with a barrage of information. There is no need to know if a bed is elevated at a ten or fifteen degree angle. Because there is so much information given (i.e., in 5-degree increments), all the numbers are difficult to read and adequacy of elevation (i.e., at least 30 degrees) cannot be easily displayed. Due to the foregoing reasons, there is lack of compliance in maintaining hospital beds at an appropriate angle.

Another device used to detect bed elevation includes a small ball that runs inside a covered groove on the arm of a bed. Angles are indicated along the curve. While this device has the advantage of working even when the bed is in Trendelenberg position, it is still very difficult to read and does not clearly indicate when the head of the bed is adequately elevated. Specifically, this device relies on the user to come very close to read the angle of elevation and then determine whether that is adequate.

Such conventional methods and systems generally have been considered unsatisfactory for their intended purpose. Despite the availability of these systems, their difficulty to use has resulted in very low levels of compliance by healthcare facilities in maintaining proper angles of inclination of patients.

Thus, although potential solutions to the problem of maintaining adequate head of bed elevation have been developed, such as discussed above, there still remains a continued need in the art for a method and device of maintaining adequate head of bed elevation that is both accurate and simple. There also remains a need in the art for a bed angle indicator that is inexpensive and easy to make. Moreover, there is a long felt need for a bed angle indicator that is easy to use to raise levels of compliance by healthcare staff. The present invention provides a solution for these problems.

SUMMARY OF THE INVENTION

The purpose and advantages of the present invention will be set forth in and apparent from the description that follows, as well as will be learned by practice of the invention. Additional advantages of the invention will be realized and attained by the methods and systems particularly pointed out in the written description and claims hereof, as well as from the appended drawings.

To achieve these and other advantages and in accordance with the purpose of the invention, as embodied herein and broadly described, the invention includes an angle indicator for measuring an angle of inclination of a structure. The angle can be measured with respect to a plane, such as a horizontal or vertical plane. The angle indicator includes a housing adapted and configured to be mounted to the structure, an indicator movably disposed in the housing having an angular range of motion about an axis intersecting the plane, and indicia provided on the housing for indicating proper angulation of the structure with respect to the plane. The indicia can be defined at least in part by a first arcuate segment, wherein the indicia and the indicator are configured to be in visual alignment to an observer when the angle of inclination of the structure with respect to the plane achieves a predetermined angle.

In accordance with a further aspect of the invention, the predetermined angle can be about thirty degrees. The predetermined angle can also be between about thirty degrees and sixty degrees, or between about zero degrees and thirty degrees. In accordance with a preferred embodiment, the predetermined angle can be about ten degrees. Moreover, the predetermined angle can also be between about ten degrees and thirty degrees and between about zero degrees and ten degrees.

In accordance with a further aspect of the invention, the indicia can include a second arcuate segment disposed adjacent to the first arcuate segment for indicating an improper angulation of the structure with respect to a horizontal plane. The first arcuate segment can be defined by a first visual pattern and the second arcuate segment can be defined by a second visual pattern distinct from the first visual pattern. For example, the first visual pattern and second visual pattern can be solid colors. Preferably, the first visual pattern is the color green and the second visual pattern is the color red.

In accordance with a further aspect of the invention, the indicator can include a pendulum, the pendulum having a first portion configured to be mounted to a pivot point intersecting the axis, and a second portion adapted and configured to visually contrast with the indicia. The second portion of the indicator can be generally needle or ball-shaped. In accordance with an alternate embodiment, the indicator can include a member adapted and configured to move along an arcuate track. The member can be a ball and the track can be a transparent tubular member, wherein the ball is adapted and configured to roll inside the tubular member. Alternatively, the member can be a slide and the track can be a wire-like member, wherein the slide is adapted and configured to slide along the wire-like member.

In accordance with still another embodiment, means can be included for illuminating the angle indicator. In accordance with this embodiment of the invention, the indicia can be made from material adapted and configured to glow in the dark. Additionally or alternatively, the indicia can be electrically illuminated. It is also possible to dispose the indicia on a transparent portion of the housing and the indicator can be viewed through the transparent portion of the housing and the indicia.

In accordance with yet another aspect of the invention, the angle indicator can further include an alarm configured and adapted to emit a signal when the indicator and the indicia are not in visual alignment. The alarm can emit an auditory and/or signal when the indicator and the indicia are not in visual alignment. Moreover, the alarm can relay an electric signal to a monitoring system when the indicator and the indicia are not in visual alignment. The alarm can also be switched off if not desired or needed at a given point in time.

In further accordance with the invention, a bed is provided. The bed includes an adjustable bed frame having a head portion. The bed frame is configured and adapted to adjust the head portion to a plurality of angles. The bed also includes an angle indicator as described above. The angle indicator is preferably adapted and configured to measure the angle of elevation of the head portion of the bed frame with respect to the horizontal plane. The angle indicator can be integrally formed with the bed frame, or provided separately from the bed and be removably attached to bed frame.

In accordance with still a further aspect of the invention, a cover is provided for covering the angle indicator of the present invention for times that it is not desired to use the angle indicator, such as when a patient should be kept flat.

It is to be understood that both the foregoing general description and the following detailed description are exemplary and are intended to provide further explanation of the invention claimed.

The accompanying drawings, which are incorporated in and constitute part of this specification, are included to illustrate and provide a further understanding of the method and system of the invention. Together with the description, the drawings serve to explain the principles of the invention.

BRIEF DESCRIPTION OF THE DRAWINGS

FIGS. 7(a)-7(f) depict various views of yet another representative embodiment of a device made in accordance with the present invention.

DETAILED DESCRIPTION OF THE PREFERRED EMBODIMENTS

Reference will now be made in detail to the present preferred embodiments of the invention, an example of which is illustrated in the accompanying drawings. The method and corresponding steps of the invention will be described in conjunction with the detailed description of the system.

The devices and methods presented herein may be used for monitoring and/or maintaining the angulation of a body or structure with respect to the horizontal or other plane (e.g., vertical or any other plane). The present invention is particularly suited for maintaining adequate head of bed elevation in a medical setting.

In accordance with the invention, an angle indicator is provided including an angle indicator for measuring an angle of inclination of a structure with respect to a plane. The angle indicator includes a housing adapted and configured to be mounted to the structure, an indicator movably disposed in the housing having an angular range of motion about an axis intersecting the plane, and indicia provided on the housing proximate the indicator for indicating proper angulation of the structure with respect to the plane.

Figure 1:
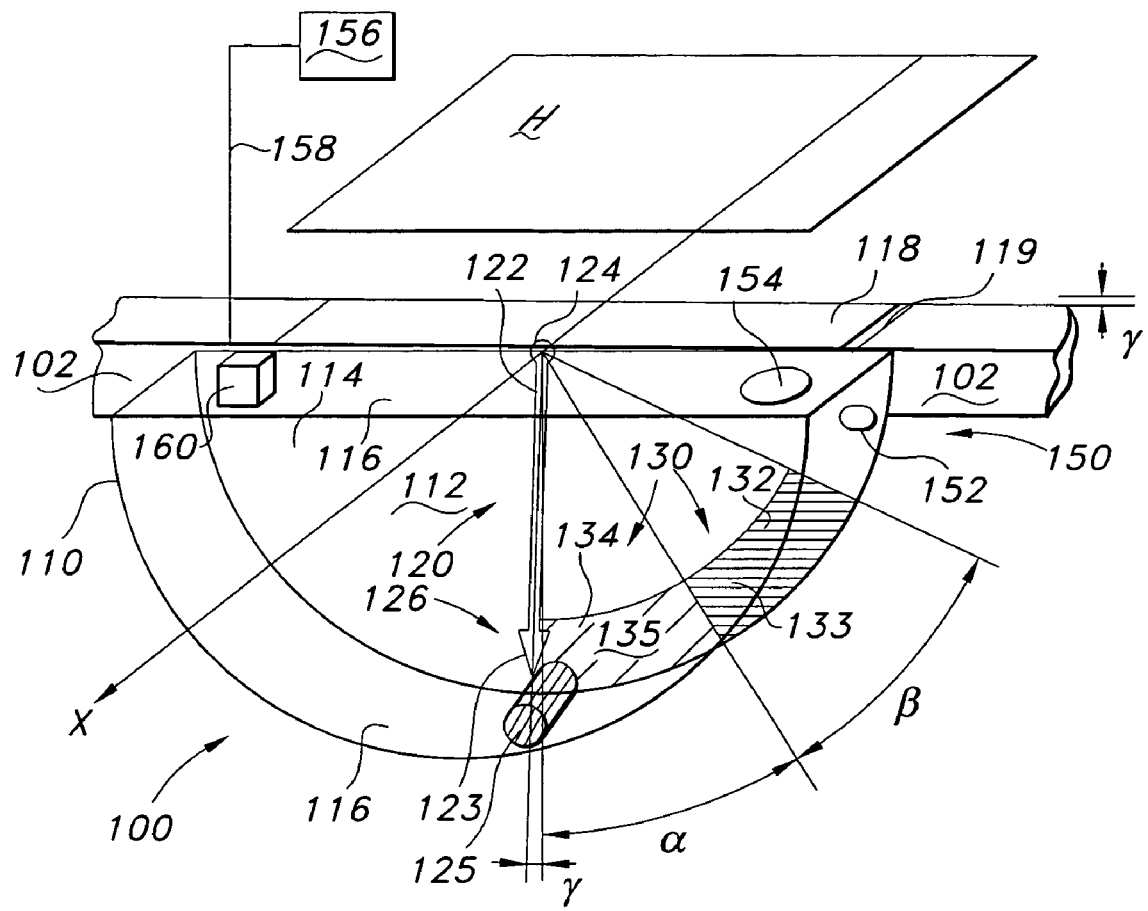
FIG. 1 is an oblique and schematic view of a first representative embodiment of a device made in accordance with the present invention.

For purpose of explanation and illustration, and not limitation, a partial view of an exemplary embodiment of the angle indicator in accordance with the invention is shown in FIG. 1 and is designated generally by reference character 100. Other embodiments of an angle indicator in accordance with the invention, or aspects thereof, are provided in FIGS. 2-4, as will be described.

In accordance with the invention, an angle indicator is provided including a housing.

For purposes of illustration and not limitation, as embodied herein and as depicted in FIG. 1, angle indicator 100 is provided with a housing 110. Housing 110 can be provided with one or more walls, such as a back wall 112, a front wall 114, a peripheral side wall 116 (which can also traverse the top of housing 110), and mounting structure 118 for mounting angle indicator 100 to structure 102.

Housing 110 can take on a variety of forms. Preferably, housing 110 is made from transparent material, such as plastic or glass, to facilitate observation the angle of inclination of a structure. As depicted, housing is made from a plurality of walls 112, 114, 116 forming an enclosed housing with a semicircular cross-section. However, other shapes are possible and within the scope of the invention. For example, housing 110 can have a fully circular cross section, or a rectangular, hexagonal, pentagonal or other cross sectional shape. Moreover, housing 110 need not be enclosed. In fact, housing can be provided with rear wall 112 only, if desired. Alternatively, housing can be provided only with a transparent front wall 114 with an indicator 120 attached thereto with transparent indicia 130 formed thereon, discussed in detail below.

Angle indicator 100 can be mounted on a variety of structures 102 by way of mounting structure 118. Mounting structure can be integrally formed with housing 110, or provided separately. Mounting structure 118 can be used to permanently attach angle indicator 100 to a structure 102, such as by adhesive or welded connection, or any other means known in the art. Alternatively, mounting structure can be used to removably attach angle indicator to structure 102 by any means known in the art. For example, angle indicator can be removably attached to structure 102 by way of permanent magnets 119 attached to mounting structure 118, hook and loop fasteners such as Velcro® brand hook and loop fasteners, screws or snap fit connection and adhesive tapes, among others.

Angle indicator 100 is particularly well suited to be mounted on a structure that needs to be maintained at a particular true angle with respect to a horizontal surface. Specifically, embodiments of angle indicator 100 that depend on gravity for moving indicator 120 with respect to indicia 130 (discussed in detail below) are well-suited for this task. Angle indicator can thus be appropriately used to determine the amount of elevation of the head of a patient's bed, as disclosed herein. However, many other applications are within the scope of the invention. For example, it is possible to use angle indicator 100 to measure the tilt angle of other pieces of furniture, such as chairs or other pieces of furniture. Moreover, it is also possible to use angle indicator to measure the angle of inclination of tiltable containers containing fluids, such as reservoirs. Angle indicator 100 can also be affixed to other portions of a hospital bed, such as the lower end of the bed when lower extremities need to be elevated. Angle indicator 100 can also be integrally formed with or within a structure, if desired, rather than being attachable by way of mounting structure 118.

In further accordance with the invention, an angle indicator is provided including an indicator movably disposed in the housing having an angular range of motion about an axis intersecting the horizontal plane, and For purposes of illustration and not limitation, as embodied herein and as depicted in FIG. 1, angle indicator 100 is provided with an indicator 120 to facilitate determination of an angle of inclination of a body with respect to the horizontal plane. Indicator 120 is movably disposed in housing 110 having an angular range of motion about an axis X intersecting the horizontal plane H.

While it may be desired to measure the angle of inclination of a structure with respect to a horizontal plane, other uses are well within the scope of the invention. For example, it may be desired to measure the angle of inclination of a structure with respect to a vertical plane or other plane tilted at any one of a number of angles.

Figure 2:
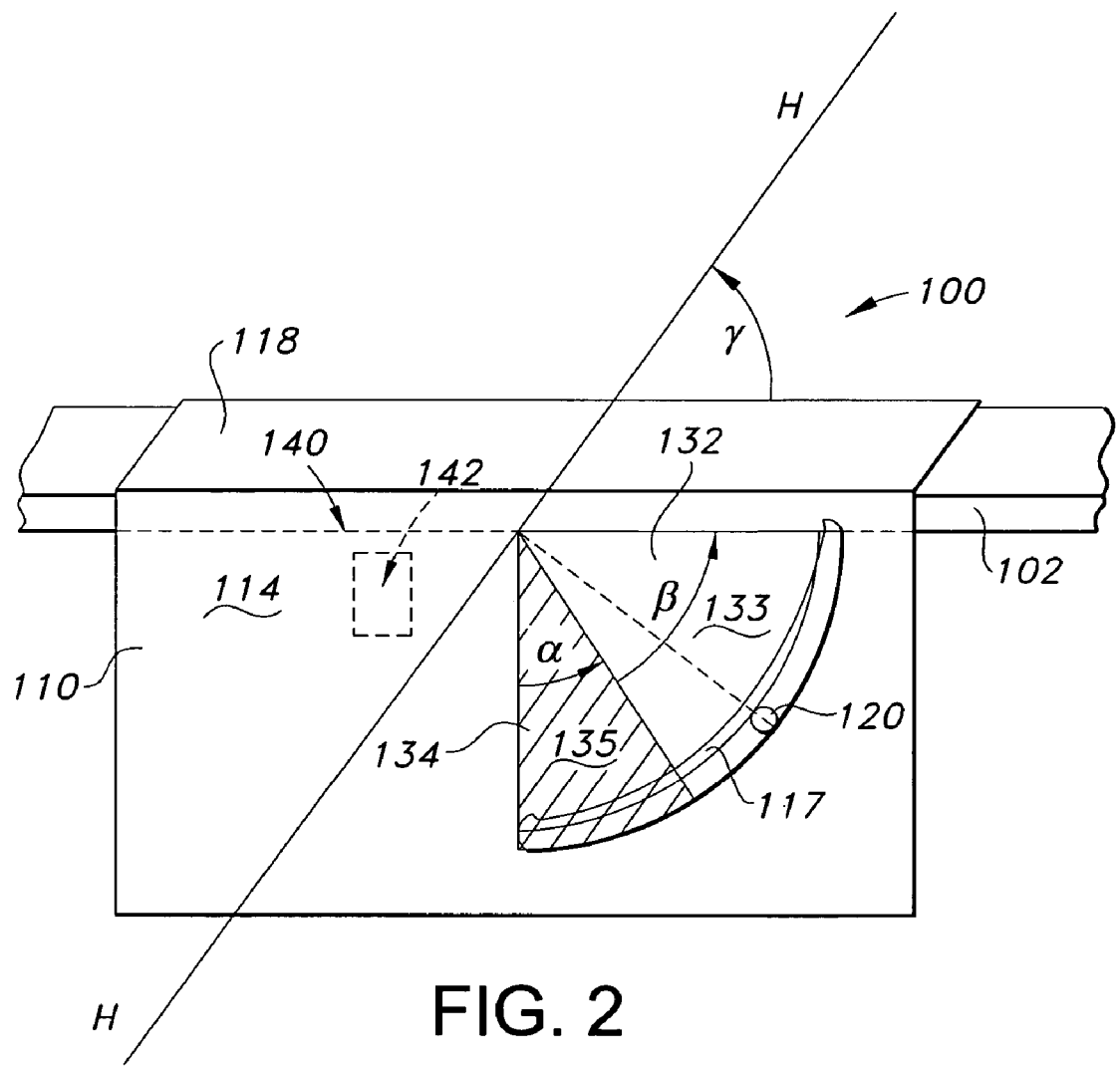
FIG. 2 is an oblique view of a second representative embodiment of a device made in accordance with the present invention.
Figure 3:
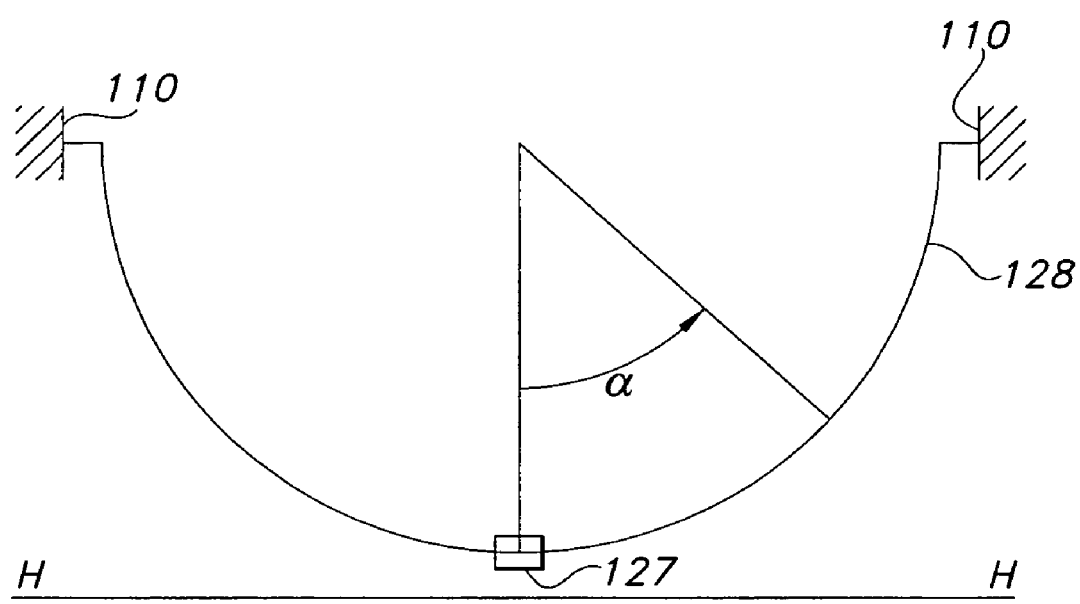
FIG. 3 is a plan view of a portion of a third representative embodiment of a device made in accordance with the present invention.

Indicator 120 can take on a variety of forms. By way of example, indicator 120 can include a pendulum as depicted in FIG. 1, the pendulum having a first portion 122 configured to be mounted to a pivot point 124 intersecting the axis X, and a second portion 126 adapted and configured to visually contrast with indicia 130, described in detail below. The second portion 126 of the indicator 120 can be generally ball-shaped (such as a ball on a string) or needle-shaped with a point 123, as depicted in FIG. 1. In accordance with an alternate embodiment, the indicator can include a cylindrical roller 125 adapted and configured to move along an arcuate path illustrated in FIG. 1. Roller 125 is adapted and configured to roll along arcuate peripheral wall 116. Alternatively, the indicator 120 can be ball-shaped and roll in a grooved track 117 as depicted in FIG. 2. By way of further example indicator 120 can be provided in the form of a slide 127 and the track can be a wire-like member 128 as depicted in FIG. 3, wherein the slide 127 is adapted and configured to slide along the wire-like member 128. Member 128 is in turn attached to housing 110.

In still further accordance with the invention, an angle indicator is provided including indicia provided on the housing proximate the indicator for indicating proper angulation of the structure.

For purposes of illustration and not limitation, as embodied herein and as depicted in FIG. 1, angle indicator 100 is provided with indicia 130. Indicia 130 is provided on the housing 110 proximate the indicator for indicating proper angulation of the structure with respect to a plane, such as the horizontal plane. The indicia 130 can be defined at least in part by a first arcuate segment 132, wherein the indicia 130 and the indicator 120 are configured to be in visual alignment to an observer when the angle of inclination of the structure with respect to the horizontal plane achieves a predetermined angle $\alpha$. First arcuate segment can occupy an angle $\beta$ corresponding to a preferred range of angular motion for structure 102.

Indicia can be formed directly on a portion of housing 110, or provided on a separate member. As depicted in FIG. 1, indicia 130 is formed on back wall 112 of housing 110. However, other variations are possible. For example, indicia 130 can be formed on a front wall 114 of housing as depicted in FIG. 2, wherein the indicia 130 and at least a portion of front wall 114 of housing 110 permit sufficient light to pass therethrough to permit indicator 120 to be observed, permitting the angle of inclination $\gamma$ of structure 102 to be observed. As depicted in FIG. 1, the angle of inclination of structure is zero degrees with respect to the horizontal plane H. Alternatively, as depicted in FIG. 2, the angle of inclination of the structure 102 has a value greater than zero degrees with respect to the horizontal plane indicated by line H.

In accordance with a further aspect of the invention, the predetermined angle $\alpha$ is preferably at least thirty degrees for purposes of treating disorders such as aspiration pneumonia. When maintaining accurate head of bed elevation for a patient, it is critical to maintain a true angle of inclination of at least thirty degrees above the horizontal plane in order to avoid potentially fatal complications such as aspiration pneumonia. For example, an angular range of 30 to 60 degrees can be appropriate. However, other predetermined angles may be desired for treating patients with different conditions such as those recovering from brain surgery, as discussed below. Angle indicator 100 can be used to maintain bed elevations in these situations as well.

Figure 5:
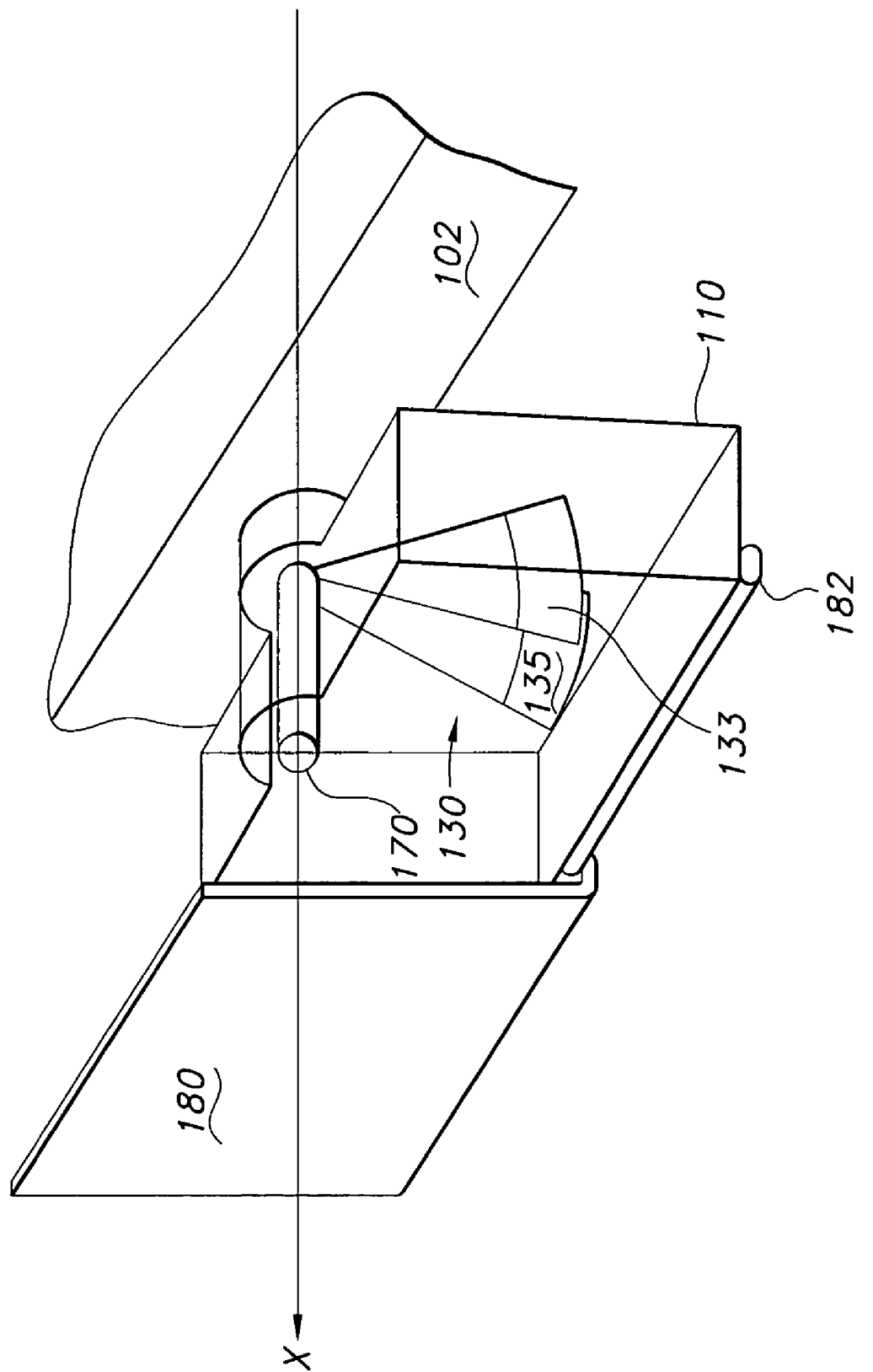
FIG. 5 is a view of another representative embodiment of a device made in accordance with the present invention.

In accordance with another embodiment, the predetermined angle α can be changed. For purposes of illustration only, as depicted in FIG. 5, housing 110 can be provided with a pivot 170 for controllably pivoting the housing with respect to a structure 102. This way, different predetermined angles α can be established by rotating housing 110 with respect to the structure 102. However, the predetermined angle can be adjusted in other ways. If desired, as embodied in FIG. 5, the indicia 133, 135 can be configured to rotate about the axis X within the housing 110 from a first angular position to a second angular position to establish the proper angular range that structure 102 should be maintained within. Moreover, indicia 133, 135 can be separately formed as indicated in FIG. 5 such that they can overlap to facilitate adjusting a predetermined angle at which to maintain a structure.

As depicted in FIG. 1, the indicia 130 can include a second arcuate segment 134 disposed adjacent to the first arcuate segment 132 for indicating an improper angulation of the structure 102 with respect to the horizontal plane H. As illustrated in FIG. 1, arcuate segment 134 traverses an angle between the horizontal plane and angle α. Until structure 102 is angulated by an angle α or more, indicator 120 will overlap visually with second arcuate segment 134. In this situation, an operator of the structure, such as a nurse inspecting the head of bed elevation of a patient, will be notified of the inadequate head of bed elevation, and be able to elevate the head of the patient's bed until indicator 120 overlaps with first arcuate segment 132.

As depicted in FIG. 1, first arcuate segment 132 can be defined by a first visual pattern 133 and second arcuate segment 134 can be defined by a second visual pattern 135 distinct from the first visual pattern 133 to facilitate use of angle indicator 100. For example, the first visual pattern 133 and second visual pattern 135 can be solid colors readily distinguishable from each other. For example, the first visual pattern 133 can be the color green and the second visual pattern 135 can be the color red. Alternatively, first visual pattern 133 and second visual pattern 135 can be various geometric patterns (e.g., contrasting stripes and the like), white as contrasted to a color or pattern, a solid color as contrasted to a pattern, among others.

In accordance with still another embodiment, means can be included for illuminating the angle indicator.

For purposes of illustration and not limitation, as depicted in FIG. 2, a means for illuminating 140 is provided to facilitate observation of the angle of inclination of structure 102. As depicted in FIG. 2, an electric light 142 is used as a means for illumination 140. However, other alternatives are possible. For example, indicia 130 can be made from material adapted and configured to glow in the dark. Additionally or alternatively, the indicia 130 itself can be electrically illuminated, for example, by including one or more light-emitting diodes ("LEDs") thereon, or by positioning fiber optic elements proximate to the indicia. It is also possible to position one or more LEDs on indicator 120.

In accordance with still another embodiment, the angle indicator can further include an alarm configured and adapted to emit a signal when the indicator and the indicia are not in visual alignment.

For purposes of illustration and not limitation, as depicted in FIG. 1, an alarm 150 is provided in the form of an warning light 152. Angle indicator is adapted and configured to cause warning light 152 to light up when indicator 120 overlaps with second arcuate segment 134. Alarm 150 can alternatively emit an auditory and/or visual signal when the indicator and the indicia are not in visual alignment, such as if buzzer 154 is provided. Moreover, the alarm can relay an electric signal to a monitoring system 156 when the indicator and the indicia are not in visual alignment by way of electrical leads 158 or by using a wireless connection.

If angle indicator 100 is being used on a hospital bed, alarm 150 should be able to be turned off when it is not desired to maintain a patient at a predetermined angle, such as in the Trendelenberg position. Moreover, alarm 150 could include a light 152 provided at a foot of the patient bed that illuminates when a patient is not in a desired position. A timing device 160 could also be provided so that the bed would be in an incorrect position for a predetermined period of time (e.g., five minutes) prior to illuminating alarm 150 to allow for temporary repositioning of a patient before an alarm is triggered.

In accordance another embodiment, a cover can be provided to cover the angle indicator. For purposes of illustration and not limitation, as embodied in FIG. 5, a cover 180 can be provided to fit over the angle indicator 100 when it is not desired to use angle indicator 100. Cover can be detachable from angle indicator 100 entirely, or can be slidingly mounted on a track 182 as depicted in FIG. 5, or on hinges.

Figure 6:
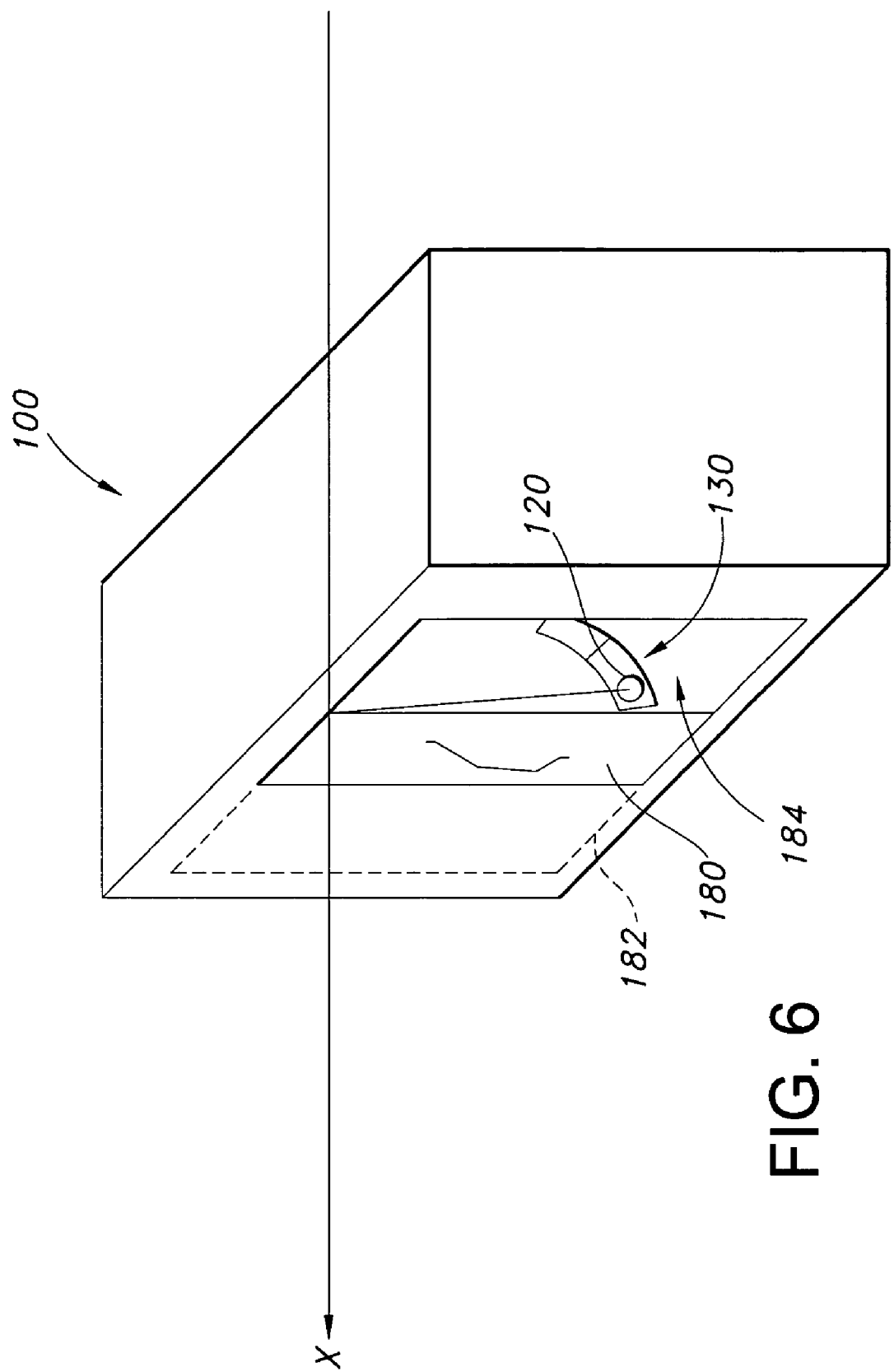
FIG. 6 is a view of still another representative embodiment of a device made in accordance with the present invention.

By way of further example, cover 180 may slide over the device 100 like a blind similar to an airplane window, as depicted in FIG. 6. When cover 180 is retracted, an observation window 184 is opened permitting indicator 120 and indicia 130 to be observed.

In accordance with another embodiment, a bed is provided having an angle indicator mounted thereon.

Figure 4:
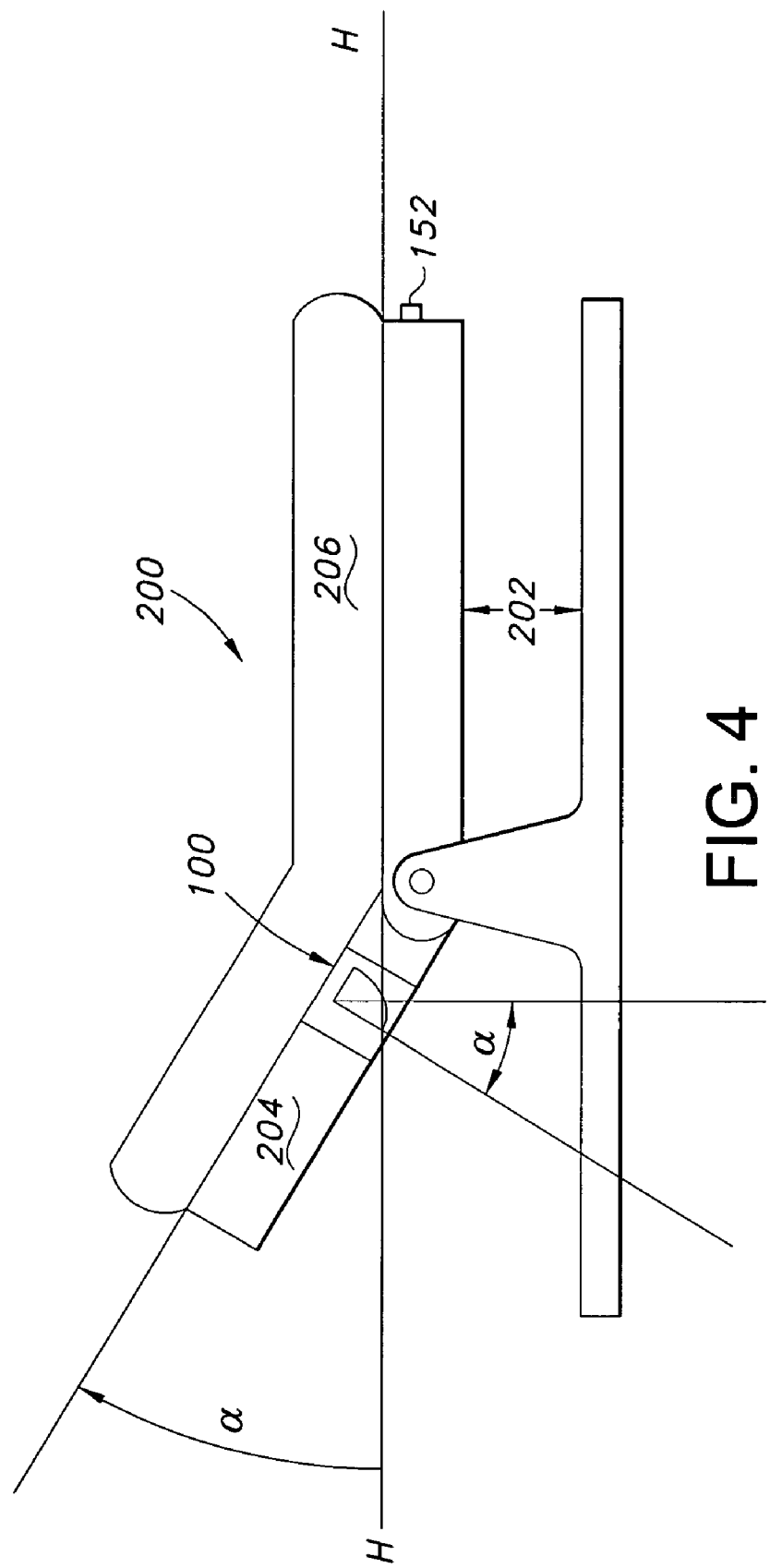
FIG. 4 is a side view of a representative device made in accordance with the invention mounted on an adjustable bed.

For purposes of illustration and not limitation, as depicted in FIG. 4, a bed 200 is provided with an angle indicator 100 as described herein mounted thereon. The bed 200 preferably includes an adjustable bed frame 202 having a head portion 204 and a mattress 206. The bed frame 200 is configured and adapted to adjust the head portion 204 to a plurality of angles, as is known in the art. Angle indicator 100 is preferably adapted and configured to measure the angle of elevation of the head portion 204 of the bed frame 200 with respect to the horizontal plane H.

An additional embodiment of an angle indicator is depicted in FIGS. 7(a)-7(f). As embodied herein, this embodiment of the invention has an indicator 120 that remains stationary with respect to back wall 112 of device 100, but the indicia 130 is pivotally mounted to device 100 on pivot 170. As depicted, pivot 170 is a stationary axle on which rotatably displaceable indicia 130 is mounted. As can be seen in FIGS. 7(c) and 7(d), when bed 200 is in a stationary position second arcuate segment 134 of indicia 130 is aligned with indicator, demonstrating that the bed is not at an adequate angle. In contrast, as depicted in FIGS. 7(e) and 7(f), when the frame 210 of the bed 200 is inclined by more than an angle α, indicator 120 aligns with first arcuate segment 132 of indicia 130, indicating that the elevation is adequate. The embodiment depicted in FIG. 7 can be made from two or more pieces, as appropriate and from a variety of materials. If desired, a clear housing 110 can be adapted to surround the components to prevent interference with surrounding objects.

As discussed herein, maintaining the head 204 of bed 200 at an angle of about thirty degrees or greater with respect to horizontal plane H can be instrumental in preventing ailments in patients, including aspiration pneumonia.

Other benefits can also flow from accurately controlling head of bed elevation, including decreasing intercranial pressure and increasing drainage from elevated areas (e.g., with cellulites). Moreover, maintaining the head of the bed at less than about thirty degrees, and even more preferably between zero and ten degrees is beneficial for patients recovering from neurological surgery. By way of further example, it is beneficial to maintain a head of bed elevation less than about thirty degrees to prevent ulcers in association with recovery from certain medical procedures. Use of a properly configured angle indicator made in accordance with the present invention can increase rates of compliance with recommended angles of inclination since, among other things, it is easy to use, facilitating compliance by healthcare workers.

The angle indicator 100 can be integrally formed with the bed frame 202, or provided separately from the bed 200 and be removably attached to bed frame 202. Actual use of a device made in accordance with the invention is described in the example below.

EXAMPLE

An experiment was conducted to test the efficacy of a device made in accordance with the invention. A first two-week trial was conducted involving taking daily head-of-bed elevation measurements throughout the intensive care units on beds without the angle indicator of the present invention. Instead, these beds included conventional means for determining head of bed elevation, such as estimation by nursing staff or a track running under the bed. At the onset of this trial, all nursing staff were reminded to maintain head-of-bed elevation at 30 degrees. During this preliminary stage of the trial, approximately 100 measurements were taken to determine the true angle of inclination of the patient beds.

After this initial trial period, a device made in accordance with the invention was placed on each bed, and measurements were taken at least 1 day after the device was placed. The next two weeks were spent collecting measurements from ICU beds that had the device installed thereon for at least twenty four hours.

The results of this trial were surprising. During the trial period without the angle measurement device in accordance with the invention, the average true angle of bed elevation was determined to be about 22 degrees on average. In contrast, the average true angle of bed elevation while using the device was 30.9 degrees above the horizontal. Moreover, if we define compliant as a bed angle elevation of greater than or equal to 28 degrees, then 23 percent of beds without the device were compliant while 71.5% of the beds with the device were compliant. The relative risk (RR) and odds ratio (OR) of having the device are 2.2 and 9.25, respectively (P<0.005). The conclusion is that beds having a device made in accordance with the invention are more likely to be compliant. This flows from the ease of use of devices made in accordance with the invention.

The methods and systems of the present invention, as described above and shown in the drawings, provide for an angle indicator with superior properties including superior results, as illustrated in the above Example. It will be apparent to those skilled in the art that various modifications and variations can be made in the device and method of the present invention without departing from the spirit or scope of the invention. Thus, it is intended that the present invention include modifications and variations that are within the scope of the appended claims and their equivalents.

What is claimed is:

1. A bed, comprising:
   a) an adjustable bed frame, the bed frame having a head portion, the bed frame configured and adapted to adjust the head portion to a plurality of angles; and
   b) an angle indicator for measuring an angle of inclination of a structure with respect to a plane, the angle indicator being adapted and configured to measure the angle of elevation of the head portion of the bed frame with respect to the horizontal plane, the angle indicator being removably attached to the bed frame, the angle indicator including:
      i) a housing adapted and configured to be mounted to the bed frame;
      ii) an indicator mounted on and movably disposed with respect to the housing having an angular range of motion about an axis intersecting the plane; and
      iii) indicia provided on the housing for indicating proper angulation of the bed frame with respect to the plane, wherein the indicia is defined at least in part by a first arcuate segment, wherein the indicia and the indicator are configured to be in visual alignment to an observer when the angle of inclination of the bed frame with respect to the plane achieves a predetermined angle.

2. The bed of claim 1, wherein the predetermined angle is about thirty degrees.

3. The bed of claim 1, wherein the predetermined angle is between about thirty degrees and sixty degrees.

4. The bed of claim 1, wherein the predetermined angle is between about zero degrees and thirty degrees.

5. The bed of claim 1, wherein the predetermined angle is about ten degrees.

6. The bed of claim 1, wherein the predetermined angle is between about ten degrees and thirty degrees.

7. The bed of claim 1, wherein the predetermined angle is between about zero degrees and ten degrees.

8. The bed of claim 1, wherein the indicia further includes a second arcuate segment disposed adjacent to the first arcuate segment for indicating an improper angulation of the bed frame with respect to a horizontal plane.

9. The bed of claim 8, wherein the first arcuate segment is defined by a first visual pattern and the second arcuate segment is defined by second visual pattern distinct from the first visual pattern.

10. The bed of claim 8, wherein the first visual pattern and second visual pattern are solid colors.

11. The bed of claim 1, wherein the indicator includes a pendulum, the pendulum having a first portion configured to be mounted to a pivot point intersecting the axis, and a second portion adapted and configured to visually contrast with the indicia.

12. The bed of claim 11, wherein the second portion is generally needle-shaped or round.

13. The bed of claim 1, wherein the indicator includes a member adapted and configured to move along an arcuate track.

14. The bed of claim 13, wherein the member is a ball and the track is a transparent tubular member, wherein the ball is adapted and configured to roll inside the tubular member.

15. The bed of claim 1, further including means for illuminating the angle indicator.

16. The bed of claim 15, wherein the indicia is made from material adapted and configured to glow in the dark.

17. The bed of claim 15, wherein the indicia is electrically illuminated.

18. The bed of claim 1, wherein the indicia is disposed on a transparent portion of the housing and the indicator can be viewed through the transparent portion of the housing and the indicia.

19. The bed of claim 1, wherein the angle indicator is adapted and configured to adjust the predetermined angle.

20. The bed of claim 1, wherein the axis lies within the plane.

21. The bed of claim 1, wherein the housing surrounds the indicator.

22. An angle indicator for measuring an angle of inclination of a structure with respect to a plane, the angle indicator comprising:
 a) a housing adapted and configured to be mounted to the structure;
 b) an indicator mounted on and movably disposed with respect to the housing having an angular range of motion about an axis intersecting the plane, wherein the indicator includes a member adapted and configured to move along an arcuate track, wherein the member is a slide and the track is a wire-like member, wherein the slide is adapted and configured to slide along the wire-like member; and
 c) indicia provided on the housing for indicating proper angulation of the structure with respect to the plane, wherein the indicia is defined at least in part by a first arcuate segment, wherein the indicia and the indicator are configured to be in visual alignment to an observer when the angle of inclination of the structure with respect to the plane achieves a predetermined angle.

23. The angle indicator of claim 22, wherein the housing surrounds the indicator.

24. An angle indicator for measuring an angle of inclination of a structure with respect to a plane, the angle indicator comprising:
 a) a housing adapted and configured to be mounted to the structure;
 b) an indicator mounted on and movably disposed with respect to the housing having an angular range of motion about an axis intersecting the plane;
 c) indicia provided on the housing for indicating proper angulation of the structure with respect to the plane, wherein the indicia is defined at least in part by a first arcuate segment, wherein the indicia and the indicator are configured to be in visual alignment to an observer when the angle of inclination of the structure with respect to the plane achieves a predetermined angle; and
 d) an alarm configured and adapted to emit a signal when the indicator and the indicia are not in visual alignment.

25. The angle indicator of claim 24, wherein the alarm emits an auditory signal when the indicator and the indicia are not in visual alignment.

26. The angle indicator of claim 24, wherein the alarm emits a visual signal when the indicator and the indicia are not in visual alignment.

27. The angle indicator of claim 24, wherein the alarm relays an electric signal to a monitoring system when the indicator and the indicia are not in visual alignment.

28. The angle indicator of claim 24, wherein the alarm can be changed from an active state to an inactive state.

29. The angle indicator of claim 24, wherein the housing surrounds the indicator.

30. A bed, comprising:
 a) an adjustable bed frame, the bed frame having a head portion, the bed frame configured and adapted to adjust the head portion to a plurality of angles; and
 b) an angle indicator pivotally attached to the bed frame, the angle indicator being adapted and configured to measure the angle of elevation of the head portion of the bed frame with respect to the horizontal plane, the angle indicator including:
  i) a housing adapted and configured to be mounted to the bed frame;
  ii) an indicator mounted on and movably disposed with respect to the housing having an angular range of motion about an axis intersecting the plane; and
  iii) indicia provided on the housing for indicating proper angulation of the bed frame with respect to the plane, wherein the indicia is defined at least in part by a first arcuate segment, wherein the indicia and the indicator are configured to be in visual alignment to an observer when the angle of inclination of the bed frame with respect to the plane achieves a predetermined angle.

31. The bed of claim 30, wherein the housing surrounds the indicator.

32. A bed, comprising:
 a) an adjustable bed frame, the bed frame having a head portion, the bed frame configured and adapted to adjust the head portion to a plurality of angles; and
 b) an angle indicator attached to the bed frame, the angle indicator being adapted and configured to measure the angle of elevation of the head portion of the bed frame with respect to the horizontal plane the angle indicator including:
  i) a housing adapted and configured to be mounted to the bed frame;
  ii) an indicator mounted on and movably disposed with respect to the housing having an angular range of motion about an axis intersecting the plane; and
  iii) indicia provided on the housing for indicating proper angulation of the bed frame with respect to the plane, wherein the indicia is defined at least in part by a first arcuate segment, wherein the indicia and the indicator are configured to be in visual alignment to an observer when the angle of inclination of the bed frame with respect to the plane achieves a predetermined angle; and
 c) a cover positioned over the angle indicator when the angle indicator is not in use.

33. The bed of claim 32, wherein the housing surrounds the indicator.

34. An angle indicator for measuring an angle of inclination of a structure with respect to a plane, the angle indicator comprising:
 a) a housing adapted and configured to be mounted to the structure;
 b) an indicator mounted on and movably disposed with respect to the housing having an angular range of motion about an axis intersecting the plane; and
 c) indicia provided on the housing for indicating proper angulation of the structure with respect to the plane, wherein the indicia is defined at least in part by a first arcuate segment, wherein the indicia and the indicator are configured to be in visual alignment to an observer when the angle of inclination of the structure with respect to the plane achieves a predetermined angle, and wherein the angle indicator is adapted and configured to adjust the predetermined angle, and further wherein the angle indicator is adapted and configured to adjust the predetermined angle by moving the indicia with respect to the housing.

35. The angle indicator of claim 34, wherein the housing surrounds the indicator.

36. An angle indicator for measuring an angle of inclination of a structure with respect to a plane, the angle indicator comprising:
   a) a housing adapted and configured to be mounted to the structure;
   b) an indicator mounted on and movably disposed with respect to the housing having an angular range of motion about an axis intersecting the plane; and
   c) indicia provided on the housing for indicating proper angulation of the structure with respect to the plane, wherein the indicia is defined at least in part by a first arcuate segment, wherein the indicia and the indicator are configured to be in visual alignment to an observer when the angle of inclination of the structure with respect to the plane achieves a predetermined angle, and wherein the angle indicator is adapted and configured to adjust the predetermined angle, and further wherein the angle indicator is adapted and configured to adjust the predetermined angle by moving the housing with respect to the structure.

37. The angle indicator of claim 36, wherein the housing surrounds the indicator.

* * * * *